W. G. WEED.
THERMOMETER HOLDER FOR INCUBATORS.
APPLICATION FILED NOV. 16, 1912.
1,080,131.
Patented Dec. 2, 1913.
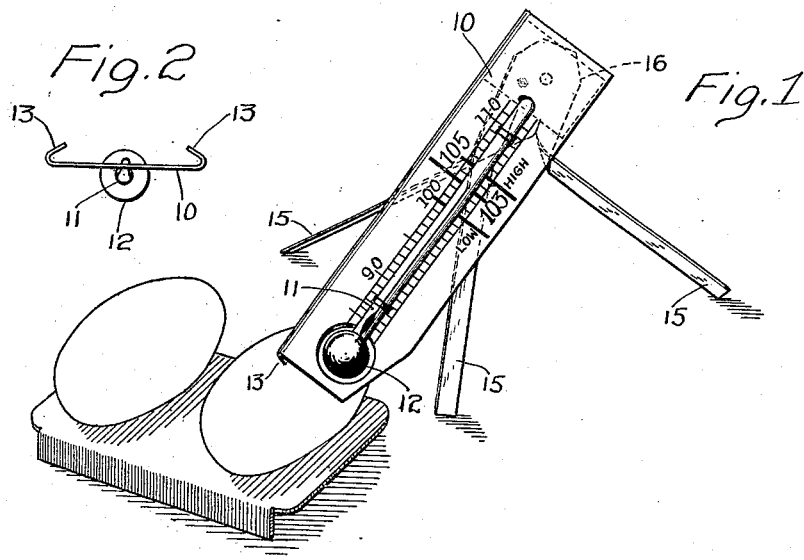
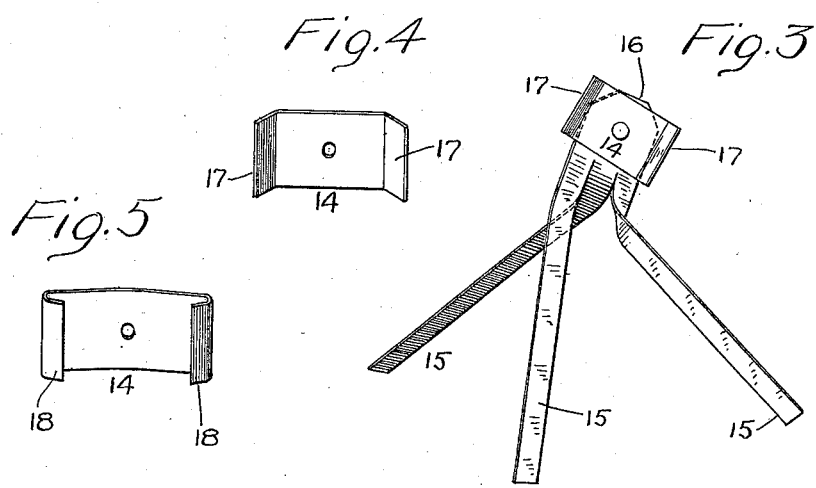
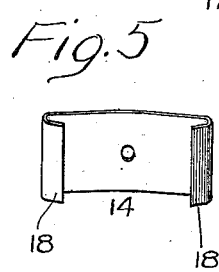
WITNESSES:
H. W. Meade
S. W. Atherton
INVENTOR
William G. Weed
BY
A. M. Wooster
ATTORNEY

UNITED STATES PATENT OFFICE.

WILLIAM G. WEED, OF STAMFORD, CONNECTICUT.

THERMOMETER-HOLDER FOR INCUBATORS.

1,080,131.      Specification of Letters Patent.      Patented Dec. 2, 1913.

Application filed November 16, 1912. Serial No. 731,805.

*To all whom it may concern:*

Be it known that I, WILLIAM G. WEED, a citizen of the United States, residing at Stamford, county of Fairfield, State of Connecticut, have invented an Improvement in Thermometer - Holders for Incubators, of which the following is a specification.

This invention has for its object to provide a simple and inexpensive thermometer holder especially adapted for use in incubators, in which it is desirable that the bulb of the thermometer should lie in contact with an egg, that the holder be adapted to set in between the eggs without displacing them and that it have well separated points of support so that the thermometer will not be liable to be overturned by the chicks when hatching takes place.

With these ends in view I have devised a thermometer holder comprising a tripod consisting simply of a piece of sheet metal slit to form three strips and a carrier pivoted thereto on which the thermometer has sliding adjustment. I am thus enabled to place the thermometer in any position among a batch of eggs and to place the bulk in contact with any egg without regard to the size of the egg.

In the accompanying drawing forming a part of this specification, Figure 1 is a perspective view showing a thermometer in place on my novel holder and illustrating the operation of the holder; Fig. 2 an end view of a thermometer detached, the plate being provided with holding flanges; Fig. 3 a perspective view of the holder without a thermometer, and Figs. 4 and 5 are views in elevation on an enlarged scale of carriers adapted respectively for thermometers with and without holding flanges.

10 denotes the plate of the thermometer, 11 the tube and 12 the bulb. The plate may or may not be provided with holding flanges 13.

The tripod is formed by making two longitudinal slits in a piece of sheet metal, separating it into three strips which form the legs 15. The slits do not extend the entire length of the plate but leave a head 16 to which the carrier 14 is pivoted, so as to be capable of oscillation but tightly enough so that it will remain, and will retain the thermometer, in any required position. As it is usually required that the thermometer lie inclined at an angle to the horizontal plane, the legs are bent substantially as shown in Fig. 3, two being bent in opposite directions and one being twisted so as to give three well separated points of support. It is also frequently required to oscillate the thermometer in the plane of its inclination. This is effected by turning the carrier on the head.

The plate of the thermometer may or may not be provided with the holding flanges, shown in Figs. 2 and 3. Where the thermometer plate is provided with these flanges the carrier is made substantially as shown in Figs. 3 and 4, that is it is provided with wings 17 standing at an angle to the plane of the carrier over which the holding flanges of the thermometer plate are adapted to slide. These wings are caused to engage the holding flanges tightly enough to hold the thermometer in any position relatively to the carrier in which it may be placed, but leaving it free to be adjusted upward or downward by the application of a little power.

The carrier, if preferred, may be made as in Fig. 5, that is, provided with holding flanges 18 which inclose the edges of the thermometer plate and retain the thermometer in any position in which it may be placed, by frictional engagement as in the other form, the only difference being the reversal of the holding flanges and edges. One edge of the thermometer plate is shown as cut away so as not to interfere with the placing of the bulb in contact with an egg.

Having thus described my invention I claim:

1. A thermometer holder comprising a tripod formed by slitting a piece of sheet metal and bending the strips to form legs, leaving a head above the legs, and a carrier pivoted to the head and provided with means for engaging a thermometer plate.

2. A thermometer holder comprising a tripod formed by slitting a piece of sheet metal and bending the strips to form legs and a carrier pivoted to the tripod and provided with means for engaging a thermometer plate.

3. A thermometer holder comprising a tripod formed by slitting a piece of sheet metal and bending the strips to form legs and a carrier pivoted to the tripod and provided with wings standing at an angle to the plane of the carrier, substantially as described, for the purpose specified.

In testimony whereof I affix my signature in presence of two witnesses.

WILLIAM G. WEED.

Witnesses:
 JOHN DUNCAN,
 GEORGE R. CLOSE.

Copies of this patent may be obtained for five cents each, by addressing the "Commissioner of Patents, Washington, D. C."